US012765536B2

(12) United States Patent
Brooks et al.

(10) Patent No.: US 12,765,536 B2
(45) Date of Patent: Oct. 20, 2026

(54) AGRICULTURAL SPRAYER WITH BOOM ASSEMBLY MOVEMENT SPEED CONTROL

(71) Applicant: CNH Industrial America LLC, New Holland, PA (US)

(72) Inventors: Nathan Paul Brooks, Manitowoc, WI (US); Jose Batz-Alvarado, Lyons, IL (US)

(73) Assignee: CNH Industrial America LLC, New Holland, PA (US)

( * ) Notice: Subject to any disclaimer, the term of this patent is extended or adjusted under 35 U.S.C. 154(b) by 675 days.

(21) Appl. No.: 17/977,493

(22) Filed: Oct. 31, 2022

(65) Prior Publication Data

US 2024/0138396 A1 May 2, 2024

(51) Int. Cl.
*A01M 7/00* (2006.01)
*A01C 23/00* (2006.01)

(52) U.S. Cl.
CPC ......... *A01M 7/0089* (2013.01); *A01C 23/007* (2013.01); *A01M 7/0042* (2013.01)

(58) Field of Classification Search
CPC . A01M 7/0089; A01M 7/0042; A01C 23/007; G05D 1/0223
See application file for complete search history.

(56) References Cited

U.S. PATENT DOCUMENTS 5,988,528 A 11/1999 Krohn et al.
6,853,890 B1 * 2/2005 Horst ...................... B61C 17/12 701/19
7,844,379 B2 11/2010 Tang et al.
11,350,621 B2 6/2022 Bauer
(Continued)

FOREIGN PATENT DOCUMENTS

| | | | |
|---|---|---|---|
| CN | 114135545 | A | 3/2022 |
| EP | 3987928 | A1 | 4/2022 |
| JP | 4999195 | B2 | 8/2012 |

(Continued)

OTHER PUBLICATIONS

"Boom Screed Spreader" VSTS-200. Vanse (Asia) Company Limited (1 page) http://www.vanse-asia.com/img/pdf/2021_5/5.%20VSTS-200%20Boom%20Screed%20Spreader.pdf.
(Continued)

*Primary Examiner* — Tuongminh N Pham
(74) *Attorney, Agent, or Firm* — Dority & Manning, P.A.

(57) ABSTRACT

An agricultural sprayer includes a frame and a boom assembly supported on the frame, with the boom assembly extending in a lateral direction between a first end and a second end. Furthermore, the agricultural sprayer includes a plurality of nozzles supported on the boom assembly and spaced apart from each other along the lateral direction, with the plurality of nozzles configured to dispense an agricultural fluid onto underlying plants or soil. Additionally, the agricultural sprayer includes an actuator configured move at least a portion of the boom assembly relative to the frame. Moreover, the agricultural sprayer includes an operator input device moveable along a range of motion such that a position of the operator input device along the range of motion is indicative of a selected speed at which the actuator is to move the at least the portion of the boom assembly relative to the frame.

11 Claims, 7 Drawing Sheets

(56) References Cited

U.S. PATENT DOCUMENTS

| | | | | |
|---|---|---|---|---|
| 2021/0153419 | A1* | 5/2021 | Winkel ................ | A01B 73/067 |
| 2022/0364337 | A1* | 11/2022 | Shimizu .................. | E02F 3/425 |

FOREIGN PATENT DOCUMENTS

| | | | |
|---|---|---|---|
| JP | 2012196158 | A | 10/2012 |
| JP | 2018157775 | A | 10/2018 |
| JP | WO2019207987 | A1 | 5/2021 |

OTHER PUBLICATIONS

"Normet Minimec" Technical data sheet 100034561 Normet International Ltd. Hünenberg, Switzerland Apr. 30, 2014 (4 pages) https://www.normet.com/wp~content/uploads/2016/09/Minimec-100034561_30.4.2014.pdf.

"ViO38-6" Mini-Excavator Yanmar Compact Equipment EMEA (12 pages) https://www.yanmar.com/media/news/2020/12/01100746/GB_ViO38-6_0222.pdf.

"Truck Mounted Concrete Pump" S 43 SX Schwing Stetter (India) Pvt. Ltd. 2008 (4 pages) http://5.iming.com/data5/TC/JO/WP/SELLER-3183279/truck-mounted-concrete-boom-pumps.pdf.

"E26C" Mini Excavator Operator's Manual New Holland Construction 1st edition English Jan. 2021 (282 pages) https://www.brimtractor.com/fckimages/pdf/manual/nhE26C_compressed.pdf.

"ZAXIS-6 series" ZAXIS135US Hitachi Construction Machinery (32 pages) https://www.hitachicm.eu/wp-content/uploads/2016/03/KS-EN363EU.pdf.

* cited by examiner

AGRICULTURAL SPRAYER WITH BOOM ASSEMBLY MOVEMENT SPEED CONTROL

FIELD OF THE INVENTION

The present disclosure generally relates to agricultural sprayers and, more specifically, to agricultural sprayers with boom assembly movement speed control.

BACKGROUND OF THE INVENTION

Agricultural sprayers apply an agricultural fluid (e.g., a pesticide, a nutrient, and/or the like) onto a field across which the sprayer is traveling. As such, a typical sprayer includes a boom assembly on which a plurality of spaced apart nozzles is mounted. Each nozzle is, in turn, configured to dispense or otherwise spray the agricultural fluid onto the underlying plants (e.g., crops, weeds, etc.) and/or soil.

Over the years, the lengths of boom assemblies have grown dramatically. For example, on some current sprayer configurations, the boom assembly can exceed one hundred feet in length. In this respect, it is necessary to fold up the boom assembly to allow for storage and/or road travel. As such, agricultural sprayers generally include actuators (e.g., hydraulic cylinders) that move the various portions of the boom assembly between an unfolded position used for spraying operations and a folded position used for road travel and storage. These actuators are, in turn, controlled by one or more operator input devices. While such agricultural sprayers work well, further improvements are needed.

Accordingly, an improved agricultural sprayer would be welcomed in the technology.

SUMMARY OF THE INVENTION

Aspects and advantages of the technology will be set forth in part in the following description, or may be obvious from the description, or may be learned through practice of the technology.

In one aspect, the present subject matter is directed to an agricultural sprayer. The agricultural sprayer includes a frame and a boom assembly supported on the frame, with the boom assembly extending in a lateral direction between a first end and a second end. Furthermore, the agricultural sprayer includes a plurality of nozzles supported on the boom assembly and spaced apart from each other along the lateral direction, with the plurality of nozzles configured to dispense an agricultural fluid onto underlying plants or soil. Additionally, the agricultural sprayer includes an actuator configured move at least a portion of the boom assembly relative to the frame. Moreover, the agricultural sprayer includes an operator input device moveable along a range of motion such that a position of the operator input device along the range of motion is indicative of a selected speed at which the actuator is to move the at least the portion of the boom assembly relative to the frame.

In another aspect, the present subject matter is directed to an agricultural sprayer. The agricultural sprayer includes a frame, a plurality of wheels coupled to the frame, and an engine configured to rotationally drive at least some of the plurality of wheels. Furthermore, the agricultural sprayer includes a cab supported on the frame and a boom assembly supported on the frame, with the boom assembly extending in a lateral direction between a first end and a second end. Additionally, the agricultural sprayer includes a plurality of nozzles supported on the boom assembly and spaced apart from each other along the lateral direction, with the plurality of nozzles configured to dispense an agricultural fluid onto underlying plants or soil. Moreover, the agricultural sprayer includes an actuator configured move at least a portion of the boom assembly relative to the frame. In addition, the agricultural sprayer includes an operator input device positioned within the cab, with the operator input device moveable along a range of motion such that a position of the operator input device along the range of motion is indicative of a selected speed at which the actuator is to move the at least the portion of the boom assembly relative to the frame.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
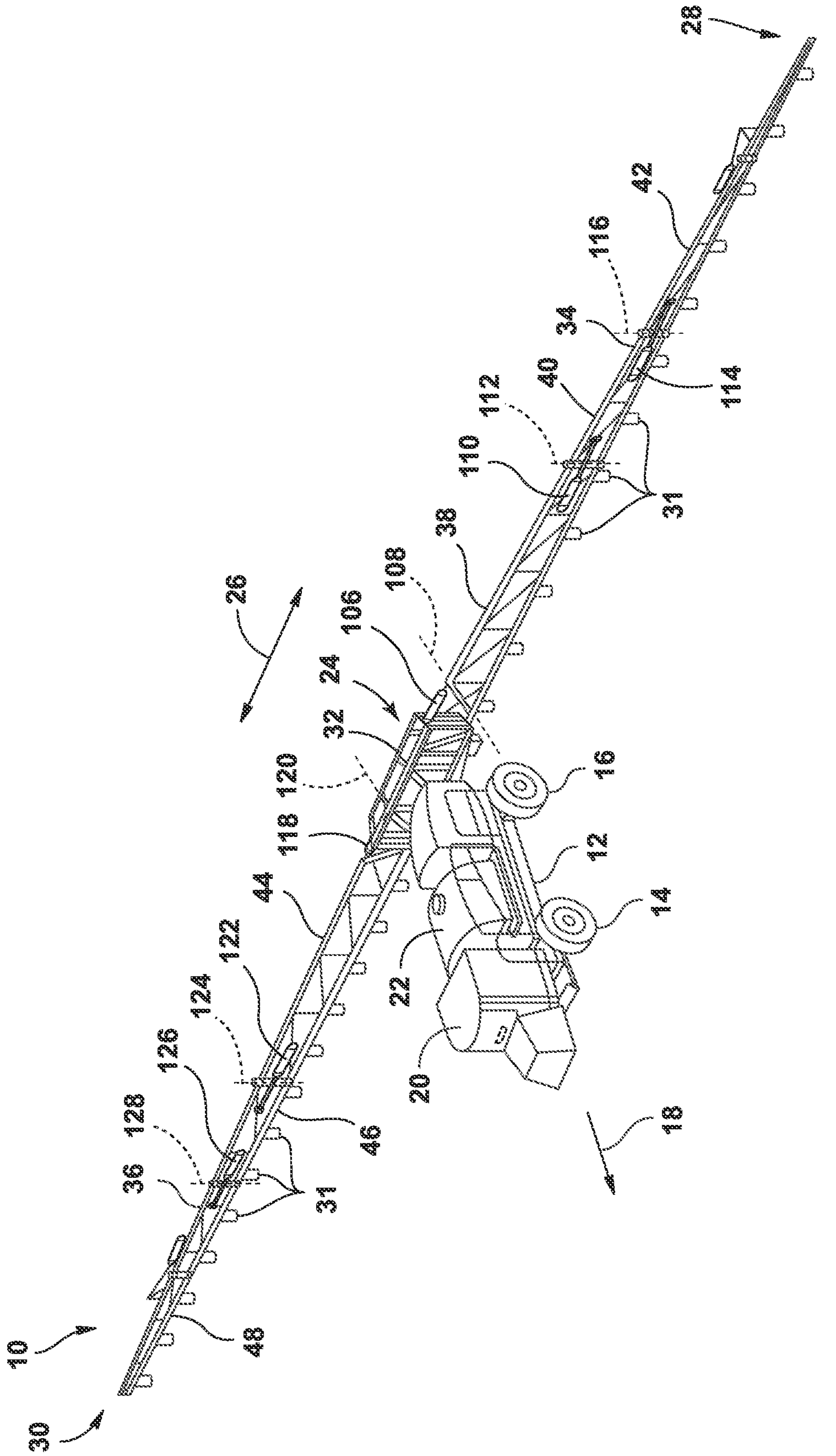
FIG. 1 illustrates a perspective view of one embodiment of an agricultural sprayer in accordance with aspects of the present subject matter.

Repeat use of reference characters in the present specification and drawings is intended to represent the same or analogous features or elements of the present technology.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield still a further embodiment. Thus, it is intended that the present invention covers such modifications and variations as come within the scope of the appended claims and their equivalents.

In general, the present subject matter is directed to an agricultural sprayer. As will be described below, the agricultural sprayer includes a boom assembly supported on its frame, with the boom assembly extending in a lateral direction between a first end and a second end. Furthermore, the agricultural sprayer includes a plurality of nozzles supported on the boom assembly and spaced apart from each other along the lateral direction. In this respect, as the agricultural sprayer travels across a field, the plurality of nozzles is configured to dispense an agricultural fluid (e.g., a pesticide, a nutrient, etc.) onto underlying plants or soil. Additionally, the agricultural sprayer includes one or more actuators (e.g., a hydraulic cylinder(s)) configured move the boom assembly (or a portion thereof) relative to the frame. For example, in some embodiments, the actuator(s) may move the boom assembly (or a portion thereof) between an unfolded position used for spraying operations and a folded position used for road travel and storage.

In several embodiments, the agricultural sprayer includes an operator input device. The operator input device is, in turn, moveable along a range of motion such that the position of the operator input device along its range of motion is indicative of a selected speed at which the actuator(s) is to move the boom assembly (or a portion thereof) relative to the frame of sprayer. In this respect, a computing system of the agricultural sprayer may be configured to receive an input associated with the position of the operator input device along its range of motion and control the operation of the actuator(s) based on the received input. For example, when the operator input device is at a first position along its range of motion, the boom assembly (or a portion thereof) may be moved at a first speed relative to the frame. Conversely, when the operator input device is at a second, different position along its range of motion, the boom assembly (or a portion thereof) may be moved at a second, different speed relative to the frame.

Controlling the speed at which the boom assembly (or a portion thereof) is moved relative to the frame based on the position of an operator input device along its range of motion improves the operation of the agricultural sprayer. In current agricultural sprayers, the boom assembly is moved at a single predetermined speed set at the factory. However, the disclosed agricultural sprayer allows for the boom assembly (or a portion thereof) to be moved at differing speeds based on operator needs and/or preferences. For example, the operator may want to move the boom assembly slowly when obstacles (e.g., trees, power lines, etc.) are nearby to prevent an accidental collision between the boom assembly and the obstacle(s). In such instances, the operator may move the operator input device to a position along its range of motion corresponding to a slower boom assembly movement speed. Conversely, the operator may want to move the boom assembly quickly when no obstacles are nearby or inclement weather is approaching. In such instances, the operator may move the operator input device to a position along its range of motion corresponding to a faster boom assembly movement speed.

Figure 2:
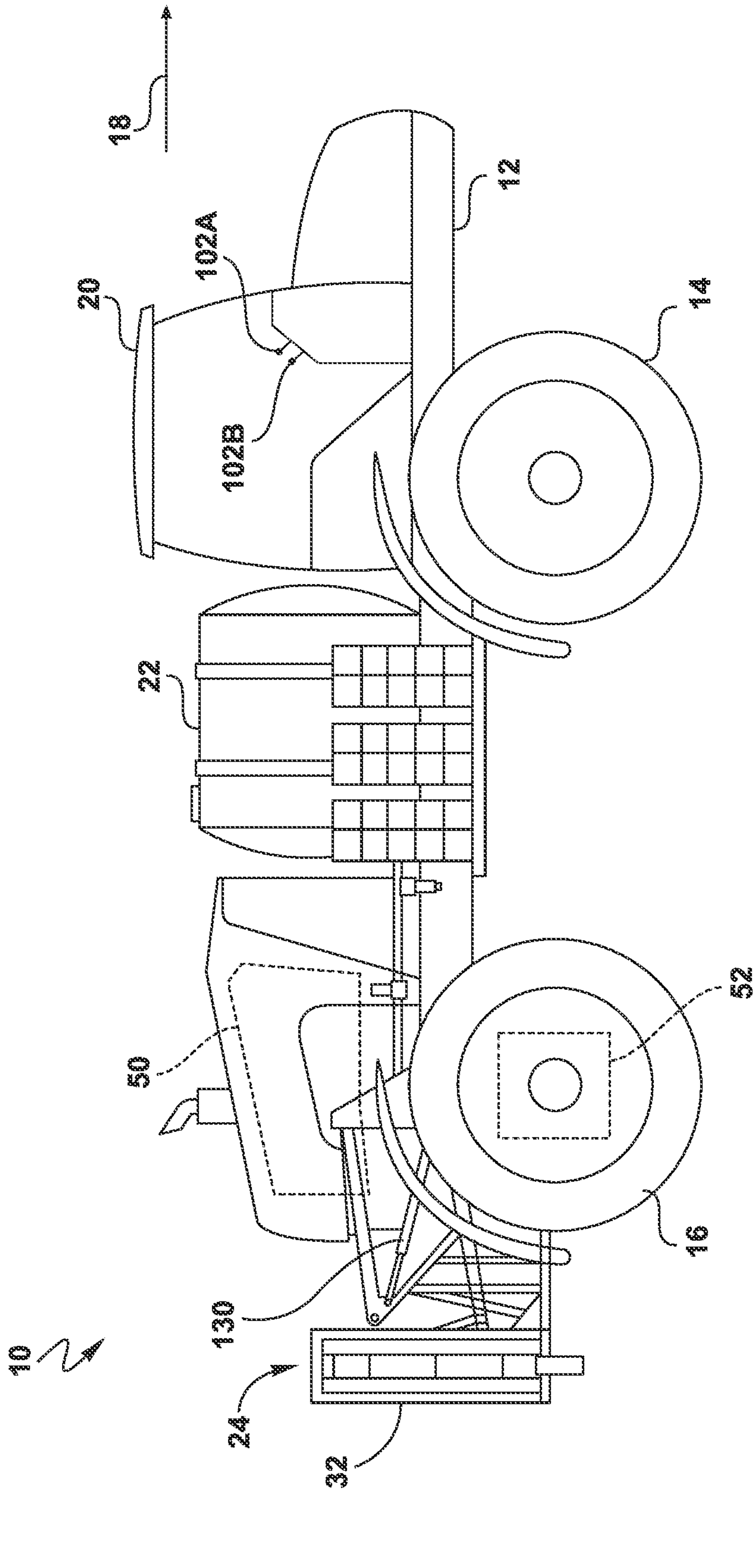
FIG. 2 illustrates a side view of the agricultural sprayer shown in FIG. 1.

Referring now to the drawings, FIGS. 1 and 2 illustrate differing views of one embodiment of an agricultural sprayer 10. Specifically, FIG. 1 illustrates a perspective view of the agricultural sprayer 10 and FIG. 2 illustrates a side view of the agricultural sprayer 10.

In the illustrated embodiment, the agricultural sprayer 10 is configured as a self-propelled agricultural sprayer. However, in alternative embodiments, the agricultural sprayer 10 may be configured as any other suitable agricultural vehicle that dispenses an agricultural fluid (e.g., a pesticide or a nutrient) while traveling across a field, such as an agricultural tractor and an associated towable sprayer.

As shown in FIGS. 1 and 2, the agricultural sprayer 10 includes a frame or chassis 12 configured to support or couple to a plurality of components. For example, a pair of steerable front wheels 14 and a pair of driven rear wheels 16 may be coupled to the frame 12. The wheels 14, 16 may be configured to support the agricultural sprayer 10 relative to the ground and move the sprayer 10 in the direction of travel 18 across the field. Furthermore, the frame 12 may support an operator's cab 20 in which one or more devices for controlling the agricultural sprayer 10 are located, such as first and second operator input devices 102A, 102B. Additionally, the frame 12 may support a tank 22 configured to store or hold an agricultural fluid, such as a pesticide (e.g., a herbicide, an insecticide, a rodenticide, and/or the like), a fertilizer, or a nutrient. However, in alternative embodiments, the sprayer 10 may include any other suitable configuration. For example, in one embodiment, the front wheels 14 of the sprayer 10 may be driven in addition to or in lieu of the rear wheels 16.

Additionally, the sprayer 10 may include a boom assembly 24 supported on the frame 12. In general, the boom assembly 24 may extend in a lateral direction 26 between a first lateral end 28 and a second lateral end 30, with the lateral direction 26 extending perpendicular to the direction of travel 18. As will be described below, a plurality of nozzles 31 may be supported on the boom assembly 24 and spaced apart from each other along the lateral direction 26. The nozzles 31 are, in turn, configured to dispense the agricultural fluid stored in the tank 22 onto the underlying plants and/or soil as the agricultural sprayer 10 travels across the field in the direction of travel 18.

In several embodiments, the boom assembly 24 includes a plurality of boom sections. For example, in the illustrated embodiment, the boom assembly 24 includes a center section 32 and a pair of wing sections 34, 36. As shown in FIG. 1, a first wing section 34 extends outwardly in the lateral direction 26 from the center section 32 to the first lateral end 28. Similarly, a second wing section 36 extends outwardly in the lateral direction 26 from the center section 32 to the second lateral end 30. Moreover, in some embodiments, the boom sections may include a plurality of boom portions. For example, in the illustrated embodiment, the first wing section 34 includes a first portion 38 coupled to the center section 32, a second portion 40 coupled to the first portion 38, and a third portion 42 coupled to the second portion 40. Similarly, in the illustrated embodiment, the second wing section 36 includes a first portion 44 coupled to the center section 32, a second portion 46 coupled to the first portion 44, and a third portion 48 coupled to the second portion 46. However, in alternative embodiments, the boom assembly 24 may include any other suitable configuration.

Figure 3:
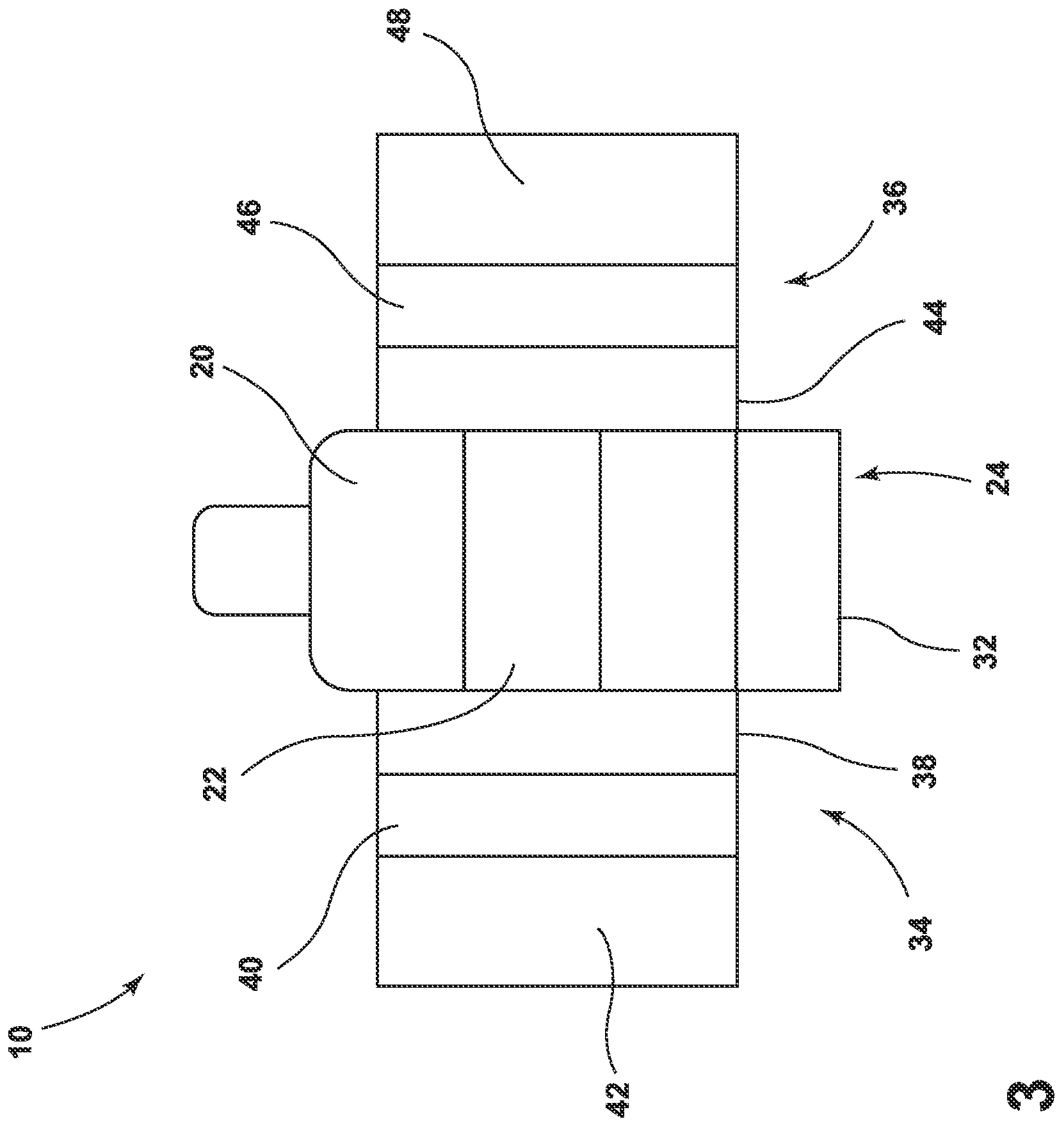
FIG. 3 illustrates a top view of the agricultural sprayer shown in FIGS. 1 and 2, particularly illustrating the boom assembly in a folded position.

Additionally, the agricultural sprayer 10 includes one or more actuators configured to move the boom assembly 24 (or a portion(s) thereof) relative to the frame 12. In this respect, the actuator(s) may be configured to move the boom assembly 24 between an unfolded position shown in FIG. 1 and a folded position shown in FIG. 3. The boom assembly 24 may be moved to the unfolded position for performing spraying operations on a field. Conversely, the boom assembly 24 may be moved to the folded position for road travel and/or storage.

As shown in FIGS. 1 and 2, the agricultural sprayer 10 includes first, second, third, fourth, fifth, sixth, and seventh actuators 106, 110, 114, 118, 122, 126, 130. More specifically, as shown in FIG. 1, the first actuator 106 is coupled between the center section 32 and the first portion 38 of the first wing section 34 such that the first actuator 106 is configured to pivot the first wing section 34 relative to the center section 32 (and the frame 12) about a pivot axis 108. Furthermore, the second actuator 110 is coupled between the first and second portions 38, 40 of the first wing section 34 such that the second actuator 110 is configured to pivot the second portion 40 relative to the first portion 38 (and the frame 12) about a pivot axis 112. Additionally, the third actuator 114 is coupled between the second and third portions 40, 42 of the first wing section 34 such that the third actuator 114 is configured to pivot the third portion 42 relative to the second portion 40 (and the frame 12) about a pivot axis 116. Moreover, the fourth actuator 118 is coupled between the center section 32 and the first portion 44 of the second wing section 36 such that the fourth actuator 118 is configured to pivot the second wing section 36 relative to the center section 32 (and the frame 12) about a pivot axis 120. In addition, the fifth actuator 122 is coupled between the first and second portions 44, 46 of the second wing section 36 such that the fifth actuator 122 is configured to pivot the second portion 46 relative to the first portion 44 (and the frame 12) about a pivot axis 124. Furthermore, the sixth actuator 126 is coupled between the second and third portions 46, 48 of the second wing section 36 such that the sixth actuator 126 is configured to pivot the third portion 48 relative to the second portion 46 (and the frame 12) about a pivot axis 128. Additionally, as shown in FIG. 2, the seventh actuator 130 is coupled between the center section 32 and the frame 12 such that the seventh actuator 130 is configured to pivot the boom assembly 24 relative to the frame. However, in alternative embodiments, the agricultural sprayer 10 may include any other suitable actuators in addition to and/or in lieu of the actuators 106, 110, 114, 118, 122, 126, 130.

In addition, the actuators 106, 110, 114, 118, 122, 126, 130 may be configured as any suitable type of actuators. For example, in the illustrated embodiment, the actuators 106, 110, 114, 118, 122, 126, 130 are configured as fluid-driven cylinders, such as hydraulic or pneumatic cylinders. However, in alternative embodiments, the actuators 106, 110, 114, 118, 122, 126, 130 may be configured as any other suitable types of actuators, such as electric linear actuators.

Referring particularly to FIG. 2, the agricultural sprayer 10 may include one or more devices or components for adjusting the ground speed at which the sprayer 10 moves across the field in the direction of travel 18. Specifically, in several embodiments, the agricultural sprayer 10 may include an engine 50 and a transmission 52 mounted on the frame 12. In general, the engine 50 may be configured to generate power by combusting or otherwise burning a mixture of air and fuel. The transmission 52 may, in turn, be operably coupled to the engine 50 and may provide variably adjusted gear ratios for transferring the power generated by the engine power to the driven wheels 16. Thus, the engine 50 may be configured to rotatably drive at least some of the wheels of the sprayer. For example, increasing the power output by the engine 50 (e.g., by increasing the fuel flow to the engine 50) and/or shifting the transmission 52 into a higher gear may increase the speed at which the agricultural sprayer 10 moves across the field. Conversely, decreasing the power output by the engine 50 (e.g., by decreasing the fuel flow to the engine 50) and/or shifting the transmission 52 into a lower gear may decrease the speed at which the agricultural sprayer 10 moves across the field.

Figure 4:
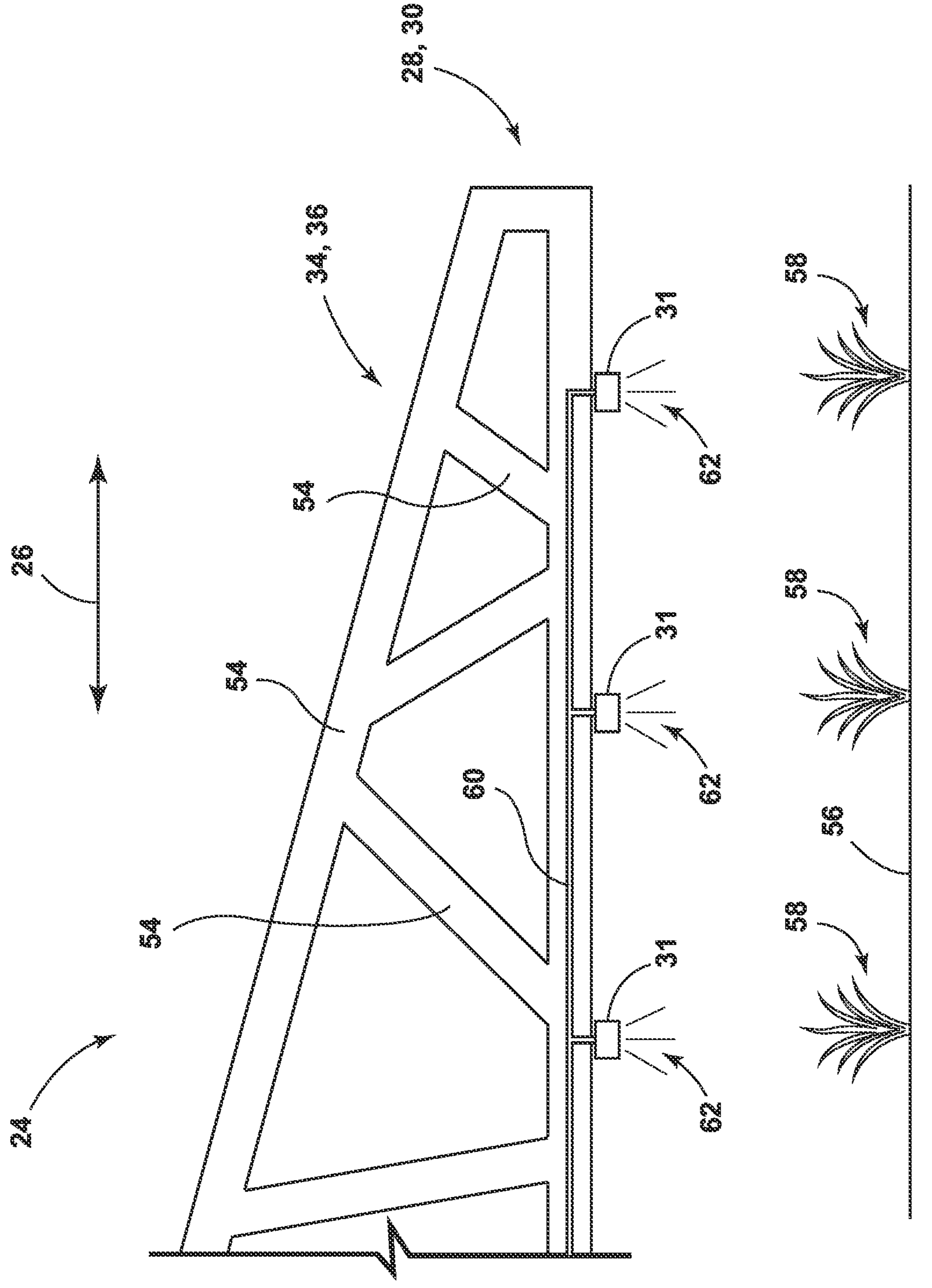
FIG. 4 illustrates a partial front view of one embodiment of a boom assembly of an agricultural sprayer in accordance with aspects of the present subject matter.

FIG. 4 illustrates a partial front view of one embodiment of a boom assembly 24 is illustrated. In general, the boom assembly 24 may include a plurality of structural frame members 54, such as beams, bars, and/or the like. Moreover, as mentioned above, the boom assembly 24 may support a plurality of nozzles 31 (also referred to as spray tips). Each nozzle 31 may, in turn, be configured to dispense the agricultural fluid stored within the tank 22 (FIG. 1) onto an underlying field surface 56 and/or plants 58 (e.g., crops, weeds, etc.). Specifically, as shown, the nozzles 31 are mounted on and/or coupled to the frame members 54 such that the nozzles 31 are spaced apart from each other in the lateral direction 26. Furthermore, fluid conduit(s) 60 may fluidly couple the nozzles 31 to the tank 22 and an associated pump (not shown). In this respect, as the sprayer 10 travels across the field in the direction of travel 18 to perform a spraying operation thereon, the pump may pump the agricultural fluid from the tank 22 through the fluid conduit(s) 60 to each of the nozzles 31. The nozzles 31 may, in turn, dispense or otherwise spray a fan 62 of the agricultural fluid onto the underlying field surface 56 and/or plants 58. For example, in one embodiment, the nozzles 31 may correspond to flat fan nozzles configured to dispense a flat fan of the agricultural fluid. However, in alternative embodiments, the nozzles 31 may correspond to any other suitable types of nozzles, such as dual pattern nozzles and/or hollow cone nozzles.

Figure 5:
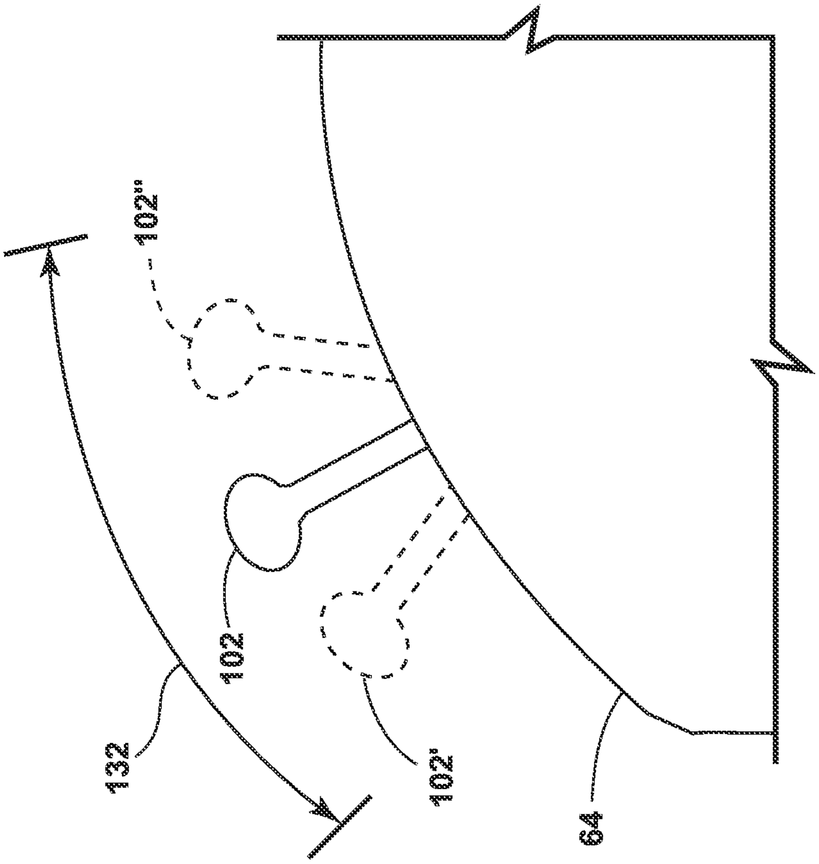
FIG. 5 illustrates a diagrammatic view of an operator input device of an agricultural sprayer in accordance with aspects of the present subject matter.

FIG. 5 illustrates a diagrammatic view of an operator input device 102 of the agricultural sprayer 10. More specifically, the operator input device 102 is moveable along a range of motion (indicated by arrow 132) such that the position of the operator input device 102 along the range of motion 132 is indicative of a selected speed at which the one or more actuators (e.g., one or more of the actuators 106, 110, 114, 118, 122, 126, 130) is to move the boom assembly 24 (or a portion(s) thereof) relative to the frame 12. For example, in one embodiment, the operator input 102 may be moved to a first position (indicated by 102') along the range of motion 132 such that the boom assembly 24 (or a portion(s) thereof) is moved relative to the frame 12 at a first speed (e.g., a low speed). Moreover, the operator input 102 may be moved to a second, different position (indicated by 102") along the range of motion 132 such that the boom assembly 24 (or a portion(s) thereof) is moved relative to the frame 12 at a second, different speed (e.g., a high speed). In this respect, the operator of agricultural sprayer 10 may move the operator input device 102 along its range of motion 132 to move the boom assembly 24 (or a portion thereof) at a selected or desired speed.

As mentioned above, the agricultural sprayer 10 may include any suitable number of operator input devices 102. For example, in one embodiment, the agricultural sprayer 10 may include a single operator input device 102 that controls the speed at which the entire boom assembly 24 is moved, such as between the folded and unfolded positions. In alternative embodiments, the agricultural sprayer 10 may include first and second operator input devices 102A, 102B (e.g., as shown in FIG. 1). In one alternative embodiment, the first operator input device 102A may control the speed at which the first wing section 34 is pivoted or otherwise moved (e.g., between the folded and unfolded positions) and the second operator input device 102B may control the speed at which the second wing section 36 is pivoted or otherwise moved (e.g., between the folded and unfolded positions). In another alternative embodiment, the first operator input device 102A may control the speed at which the boom assembly 24 (or a portion(s) thereof) is moved along a first movement path and the second operator input device 102B may control the speed at which the boom assembly 24 (or a portion(s) thereof) is moved along a second movement path. For example, the first movement path may correspond to the pivoting motion of the various boom portions about the pivot axes 108, 112, 116, 120, 124, 128 and the second may correspond to the pivoting movement of the center section 32 relative to the frame 12. In one embodiment, the different functions of the first and second operator input devices 102A, 102B may be indicated by different colors. However, in other embodiments, the agricultural sprayer 10 may include any other suitable number of operator input devices 102, such as three or more operator input devices 102 (e.g., one operator input device 102 for each actuator 106, 110, 114, 118, 122, 126, 130).

Additionally, the operator input device 102 may have any suitable configuration. For example, the illustrated embodiment, the operator input device 102 is configured as a proportional control device, such as a lever, that is movable relative to an operator control panel 64 within the cab 20. However, in alternative embodiments, the operator input device 102 may be configured as any other device that an operator can move along a range of motion, such as a proportional switch, a rocker switch, a pedal, a rotary dial, and/or the like.

Figure 6:
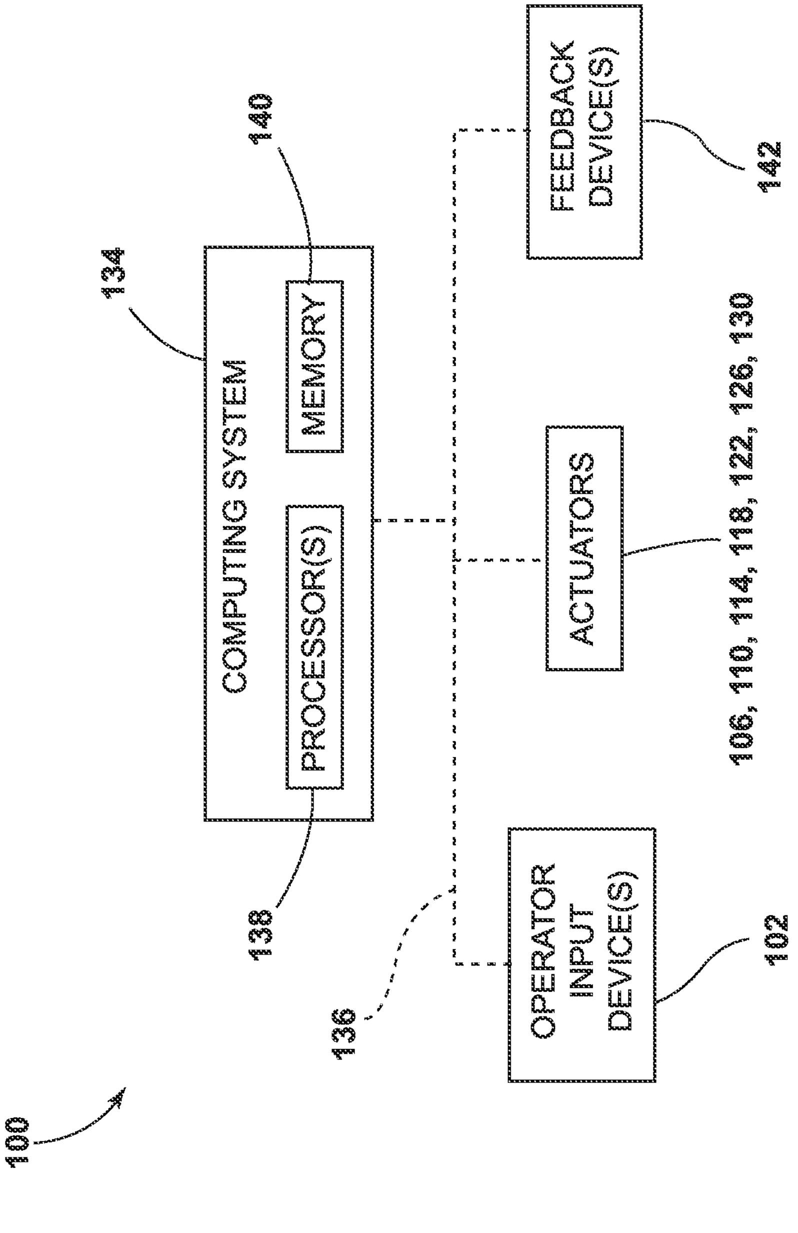
FIG. 6 illustrates a schematic view of one embodiment of a boom adjustment system of an agricultural sprayer in accordance with aspects of the present subject matter.
Figure 7:
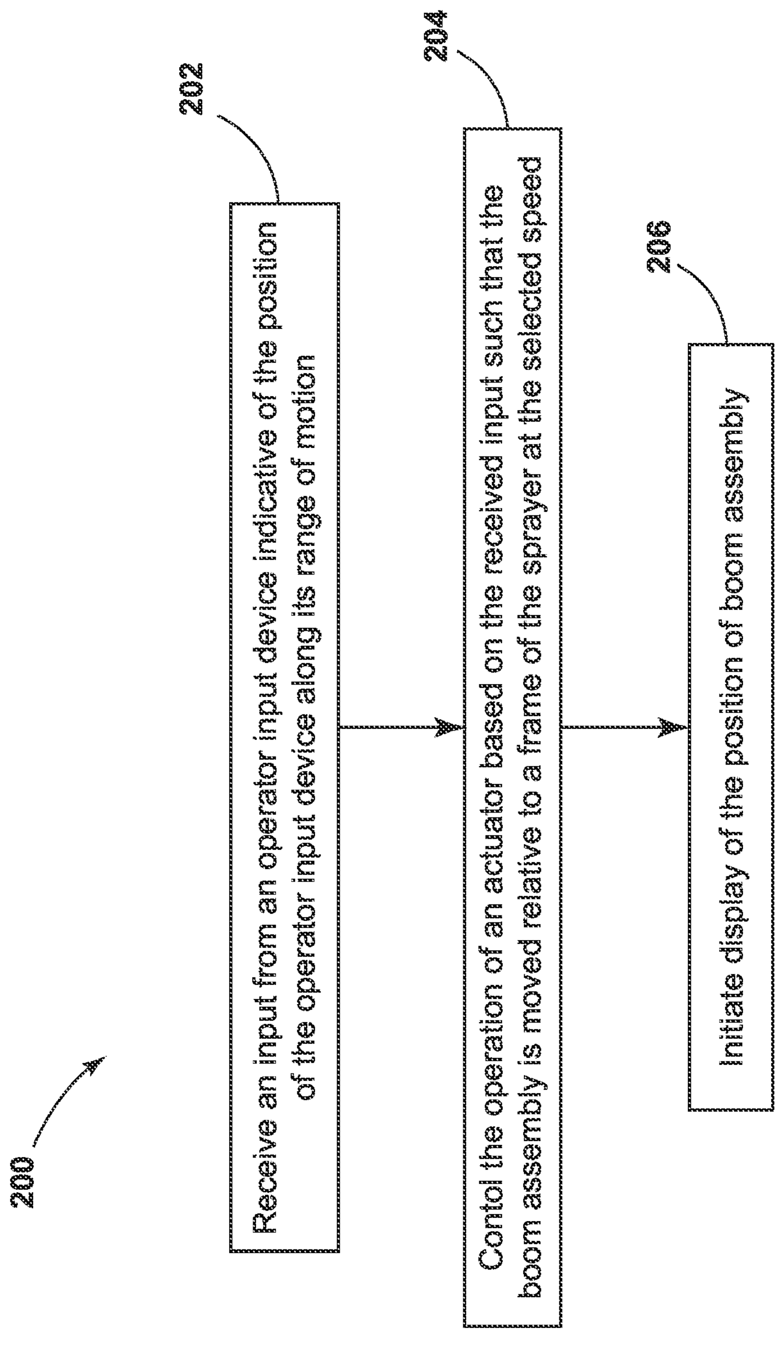
FIG. 7 illustrates a flow diagram providing one embodiment of control logic for controlling boom assembly movement speed on an agricultural sprayer in accordance with aspects of the present subject matter.

FIG. 6 illustrates a schematic view of one embodiment of a boom adjustment system 100 of the agricultural sprayer 10. For example, as shown, the boom adjustment system 100 includes the operator input device(s) 102 and the actuator(s) 106, 110, 114, 118, 122, 126, 130.

Additionally, the boom adjustment system 100 includes a computing system 134 communicatively coupled to one or more components of the boom adjustment system 100 and/or the agricultural sprayer 10 to allow the operation of such components to be electronically or automatically controlled by the computing system 134. For instance, the computing system 134 may be communicatively coupled to the operator input device(s) 102 via a communicative link 136. As such, the computing system 134 may be configured to receive an input or data from the operator input device(s) 102 that is indicative of the position(s) of the operator input device(s) 102 along the range(s) of motion and, thus, the selected speed(s) at which the boom assembly 24 (or a portion(s) thereof) is to be moved. Furthermore, the computing system 134 may be communicatively coupled to the actuators 106, 110, 114, 118, 122, 126, 130 via the communicative link 136. In this respect, the computing system 134 may be configured to control the operation of the actuators 106, 110, 114, 118, 122, 126, 130 to move the boom assembly 24 (or a portion(s) thereof) at a selected speed(s). In addition, the computing system 134 may be communicatively coupled to any other suitable components of the boom adjustment system 100 and/or the agricultural sprayer 10.

In general, the computing system 134 may comprise one or more processor-based devices, such as a given controller or computing device or any suitable combination of controllers or computing devices. Thus, in several embodiments, the computing system 134 may include one or more processor(s) 138 and associated memory device(s) 140 configured to perform a variety of computer-implemented functions. As used herein, the term "processor" refers not only to integrated circuits referred to in the art as being included in a computer, but also refers to a controller, a microcontroller, a microcomputer, a programmable logic circuit (PLC), an application specific integrated circuit, and other programmable circuits. Additionally, the memory device(s) 140 of the computing system 134 may generally comprise memory element(s) including, but not limited to, a computer readable medium (e.g., random access memory RAM)), a computer readable non-volatile medium (e.g., a flash memory), a floppy disk, a compact disk-read only memory (CD-ROM), a magneto-optical disk (MOD), a digital versatile disk (DVD) and/or other suitable memory elements. Such memory device(s) 140 may generally be configured to store suitable computer-readable instructions that, when implemented by the processor(s) 138, configure the computing system 134 to perform various computer-implemented functions, such as one or more aspects of the methods and algorithms that will be described herein. In addition, the computing system 134 may also include various other suitable components, such as a communications circuit or module, one or more input/output channels, a data/control bus and/or the like.

The various functions of the computing system 134 may be performed by a single processor-based device or may be distributed across any number of processor-based devices, in which instance such devices may be considered to form part of the computing system 134. For instance, the functions of the computing system 134 may be distributed across multiple application-specific controllers or computing devices, such as a navigation controller, an engine controller, a transmission controller, a spray controller, and/or the like.

In addition, the boom adjustment system 100 may also include one or more feedback devices 142. More specifically, the feedback device(s) 142 may be configured to provide feedback from the computing system 134 (e.g., feedback associated with the position of the boom assembly 24 (or a portion(s) thereof)) to the operator. As such, the feedback device(s) 142 may correspond to a display screen(s), a speaker(s), a warning light(s), and/or the like, which are configured to provide feedback from the computing system 134 to the operator. As such, the feedback device(s) 142 may, in turn, be communicatively coupled to the computing system 134 via the communicative link 136 to permit the feedback signals to be transmitted from the computing system 134 to the feedback device(s) 142. In some embodiments, the feedback device(s) 142 may be mounted or otherwise positioned within the cab 20 of the agricultural sprayer 10. However, in alternative embodiments, the feedback device(s) 142 may mounted at any other suitable location.

FIG. 6 illustrates a flow diagram of one embodiment of example control logic 200 that may be executed by the computing system 134 (or any other suitable computing system) for controlling boom assembly movement speed. Specifically, the control logic 200 shown in FIG. 6 is representative of steps of one embodiment of an algorithm that can be executed to adjust the position of a boom assembly (or a portion(s) thereof) of an agricultural sprayer in a manner that allows for the speed at which the boom assembly (or the portion(s) thereof) is moved to be adjusted by the operator in real-time.

As shown, at (202), the control logic 200 includes receiving an input from an operator input device of an agricultural sprayer that is indicative of the position of the operator input device along its range of motion. Specifically, as mentioned above, in several embodiments, the computing system 134 may be communicatively coupled to the operator input device(s) 102 via the communicative link 136. In this respect, when it is desired to move the boom assembly 24 or a portion(s) thereof (e.g., between the folded and unfolded positions), the operator may move the corresponding operator input device(s) 102 to the position along the corresponding range(s) of motion 132 associated with a selected speed at which the operator would like for the boom assembly 24 (or the portion(s) thereof) to move. Thereafter, the computing system 134 may receive an input or data indicative the position(s) of the operator input device(s) 102 along the corresponding range(s) of motion 132 via the communicative link 136.

Furthermore, at (204), the control logic 200 includes controlling the operation of an actuator of the agricultural implement based on the received input such that at least a portion of a boom assembly of the agricultural sprayer is moved relative to a frame of the sprayer at the selected speed. Specifically, as mentioned above, in several embodiments, the computing system 134 may be communicatively coupled to the actuators 106, 110, 114, 118, 122, 126, 130 via the communicative link 136. In this respect, the computing system 134 may determine the selected speed at which the boom assembly 24 or the portion(s) thereof is to be moved based on the input or data received at (202). Thereafter, the computing system 134 may transmit control signals to one or more of the actuators 106, 110, 114, 118, 122, 126, 130 configured to move the boom assembly 24 or the portion(s) thereof in the desired manner. Such control signals, in turn, instruct the one or more of the actuators 106, 110, 114, 118, 122, 126, 130 to move the boom assembly 24 or the corresponding portion(s) thereof at the selected speed as indicated by the position(s) of the operator control device(s) 102 along the range(s) of motion 132.

Additionally, at (206), the control logic 200 includes initiating display of the position of the boom assembly to the operator. Specifically, in several embodiments, the computing system 134 initiate display of the current position of the boom assembly 24 (or a portion(s) thereof) to the operator, such as based on received positional sensor data associated with the boom assembly 24. For example, the computing system 134 may transmit feedback signals to the feedback device(s) 142 of the agricultural sprayer 10. Such feedback signals, in turn, instruct the feedback device(s) display the current position of the boom assembly 24 (or a portion(s) thereof) to the operator.

It is to be understood that the steps of the control logic 200 are performed by the computing system 134 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the computing system 134 described herein, such as the control logic 200, is implemented in software code or instructions which are tangibly stored on a tangible computer readable medium. The computing system 134 loads the software code or instructions via a direct interface with the computer readable medium or via a wired and/or wireless network. Upon loading and executing such software code or instructions by the computing system 134, the computing system 134 may perform any of the functionality of the computing system 134 described herein, including any steps of the control logic 200 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

The invention claimed is:

1. An agricultural sprayer, comprising:

a frame;

a boom assembly supported on the frame, the boom assembly extending in a lateral direction between a first end and a second end, the boom assembly comprising a center section, a first wing section coupled to the center section, and a second wing section coupled to the first wing section;

a plurality of nozzles supported on the boom assembly and spaced apart from each other along the lateral direction, the plurality of nozzles configured to dispense an agricultural fluid onto underlying plants or soil;

a first actuator configured to move the first wing section and the second wing section relative to the center section;

a second actuator configured to move the second wing section relative to the first wing section;

an operator control panel;

a first lever moveable relative to the operator control panel along a range of motion such that a position of the first lever relative to the operator control panel along the range of motion is indicative of a selected speed at which the first actuator is to move the first wing section and the second wing section relative to the center section;

a second lever moveable relative to the operator control panel along a range of motion such that a position of the second lever relative to the operator control panel along the range of motion is indicative of a selected speed at which the second actuator is to move the second wing section relative to the first wing section; and a feedback device that displays a current position of the boom assembly of the agricultural sprayer to an operator.

2. The agricultural sprayer of claim 1, wherein a first position of the first lever relative to the operator control panel along the range of motion corresponds to a first selected speed and a second position of the first lever relative to the operator control panel along the range of motion corresponds to a second selected speed, the second position being different than the first position, the second selected speed being different than the first selected speed.

3. The agricultural sprayer of claim 1, further comprising:

a computing system communicatively coupled to the first lever, the computing system configured to:

receive an input from the first lever indicative of the position of the first lever relative to the operator control panel along the range of motion; and control an operation of the first actuator based on the received input such that the first wing section and the second wing section are moved relative to the center section at the selected speed.

4. The agricultural sprayer of claim 1, wherein the first actuator is configured to move the first wing section and the second wing section between a folded position and an unfolded position such that the position of the first lever relative to the operator control panel along the range of motion is indicative of the selected speed at which the first actuator is to move the first wing section and the second wing section between the folded position and the unfolded position.

5. The agricultural sprayer of claim 1, wherein the first actuator is configured to pivot the first wing section and the second wing section relative to the center section such that the position of the first lever relative to the operator control panel along the range of motion is indicative of the selected speed at which the first actuator is to pivot the first wing section and the second wing section.

6. The agricultural sprayer of claim 1, further comprising:

a cab supported on the frame, wherein the operator control panel, the first lever, and the second lever are positioned within the cab.

7. An agricultural sprayer, comprising:

a frame;

a plurality of wheels coupled to the frame;

an engine configured to rotationally drive at least some of the plurality of wheels;

a cab supported on the frame;

a boom assembly supported on the frame, the boom assembly extending in a lateral direction between a first end and a second end, the boom assembly comprising a center section, a first wing section coupled to the center section, and a second wing section coupled to the first wing section;

a plurality of nozzles supported on the boom assembly and spaced apart from each other along the lateral direction, the plurality of nozzles configured to dispense an agricultural fluid onto underlying plants or soil;

a first actuator configured to move the first wing section and the second wing section relative to the center section;

a second actuator configured to move the second wing section relative to the first wing section;

an operator control panel;

a first lever positioned within the cab, the first lever moveable relative to the control panel along a range of motion such that a position of the first lever relative to the operator control panel along the range of motion is indicative of a selected speed at which the first actuator is to move the first wing section and the second wing section relative to the center section; and a second lever positioned within the cab, the second lever moveable relative to the control panel relative to the operator control panel along a range of motion such that a position of the second lever relative to the operator control panel along the range of motion is indicative of a selected speed at which the second actuator is to move the second wing section relative to the first wing section; and a feedback device that displays a current position of the boom assembly of the agricultural sprayer to an operator.

8. The agricultural sprayer of claim 7, wherein a first position of the first lever relative to the operator control panel along the range of motion corresponds to a first selected speed and a second position of the first lever relative to the operator control panel along the range of motion corresponds to a second selected speed, the second position being different than the first position, the second selected speed being different than the first selected speed.

9. The agricultural sprayer of claim 7, further comprising:

a computing system communicatively coupled to the first lever, the computing system configured to:

receive an input from the first lever indicative of the position of the first lever relative to the operator control panel along the range of motion; and control an operation of the first actuator based on the received input such that the first wing section and the second wing section are moved relative to the center section at the selected speed.

10. The agricultural sprayer of claim 7, wherein the first actuator is configured to move the first wing section and the second wing section between a folded position and an unfolded position such that the position of the first lever relative to the operator control panel along the range of motion is indicative of the selected speed at which the first actuator is to move the first wing section and the second wing section between the folded position and the unfolded position.

11. The agricultural sprayer of claim 7, wherein the first actuator is configured to pivot the first wing section and the second wing section relative to the center section such that the position of the first lever relative to the operator control panel along the range of motion is indicative of the selected speed at which the first actuator is to pivot the first wing section and the second wing section.

* * * * *